United States Patent
Paleiov et al.

(10) Patent No.: US 6,560,320 B1
(45) Date of Patent: May 6, 2003

(54) ADAPTABLE SUBSCRIBER UNIT FOR INTERACTIVE TELEPHONE APPLICATIONS

(75) Inventors: Ilan Paleiov, Kfar Veradim (IL); Benjamin Cohen, Mitzpeh Gilon (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/464,823

(22) Filed: Dec. 17, 1999

(51) Int. Cl.[7] .............................................. H04M 11/00
(52) U.S. Cl. ................ 379/93.23; 379/93.26; 379/93.17
(58) Field of Search .......................... 379/93.23, 93.17, 379/93.25, 93.05, 93.06, 93.07, 93.08, 88.13, 88.14, 88.17, 88.18, 93.26

(56) References Cited

U.S. PATENT DOCUMENTS

| | | | |
|---|---|---|---|
| 5,666,215 A | * | 9/1997 | Fredlund et al. ............ 358/487 |
| 5,703,942 A | | 12/1997 | Pinard et al. |
| 5,809,119 A | | 9/1998 | Tonomura et al. |
| 5,818,871 A | | 10/1998 | Blakeney, II et al. |
| 5,838,775 A | | 11/1998 | Montalbano |
| 5,903,630 A | | 5/1999 | Collins |
| 5,999,207 A | * | 12/1999 | Rodriguez et al. ........ 379/93.17 |
| 6,044,133 A | * | 3/2000 | Furukawa et al. ........ 379/88.01 |
| 6,091,805 A | * | 7/2000 | Watson ..................... 379/93.17 |
| 6,411,685 B1 | * | 6/2002 | O'Neal ..................... 379/88.14 |

\* cited by examiner

*Primary Examiner*—Melur Ramakrishnaiah
(74) *Attorney, Agent, or Firm*—Darby & Darby

(57) ABSTRACT

A method for telephone communications includes providing a protocol that defines a relation between predetermined graphic elements and respective sequences of dual-tone multi-frequency (DTMF) signals. A screen to be displayed is designed, including one or more of the graphic elements. An encoded representation of the screen is then generated using DTMF signals in accordance with the protocol. The encoded representation is transmitted over a telephone line to a telephone subscriber unit, whereby the one or more graphic elements are displayed by the subscriber unit responsive to the encoded representation of the screen.

34 Claims, 3 Drawing Sheets

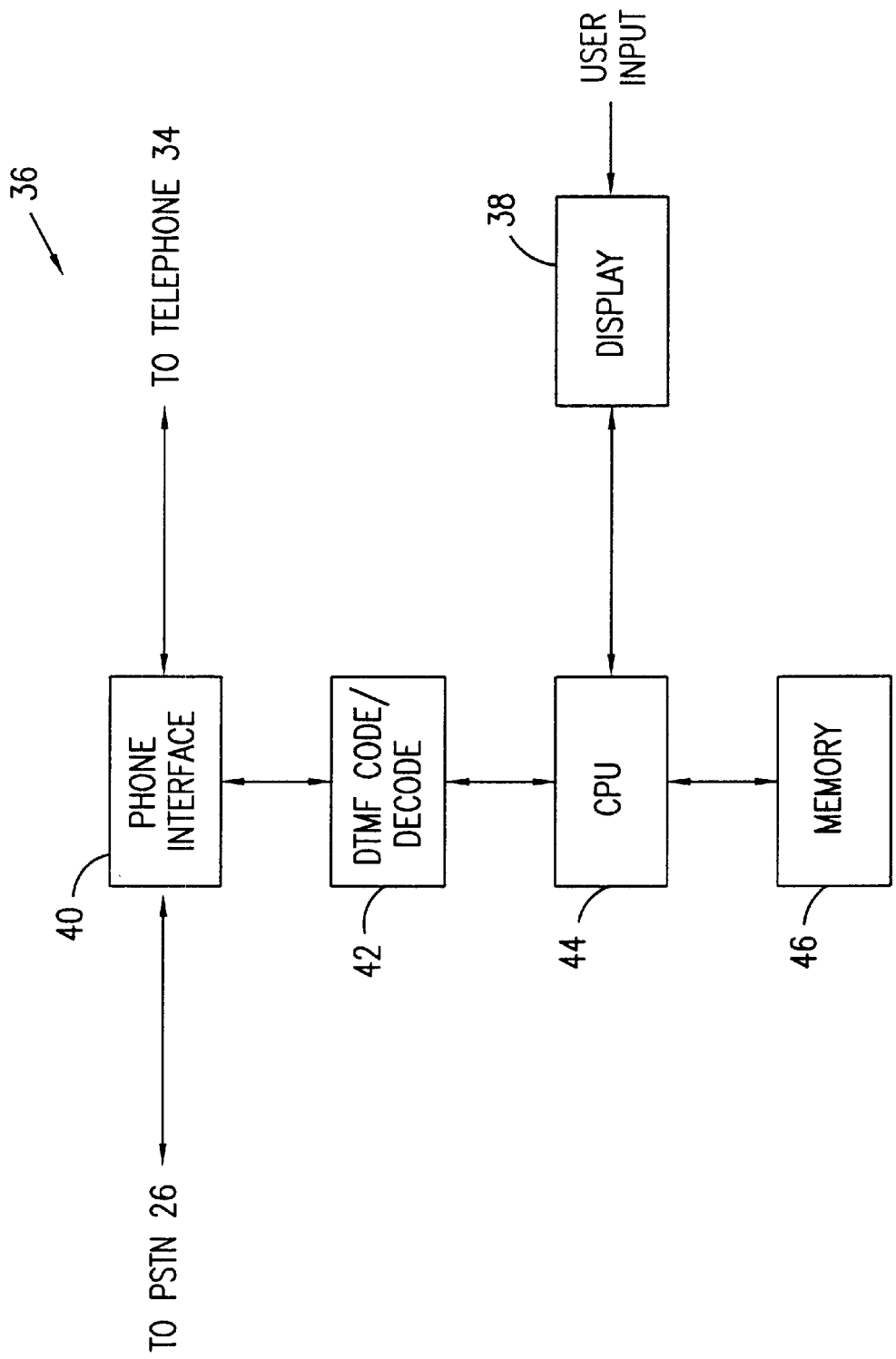

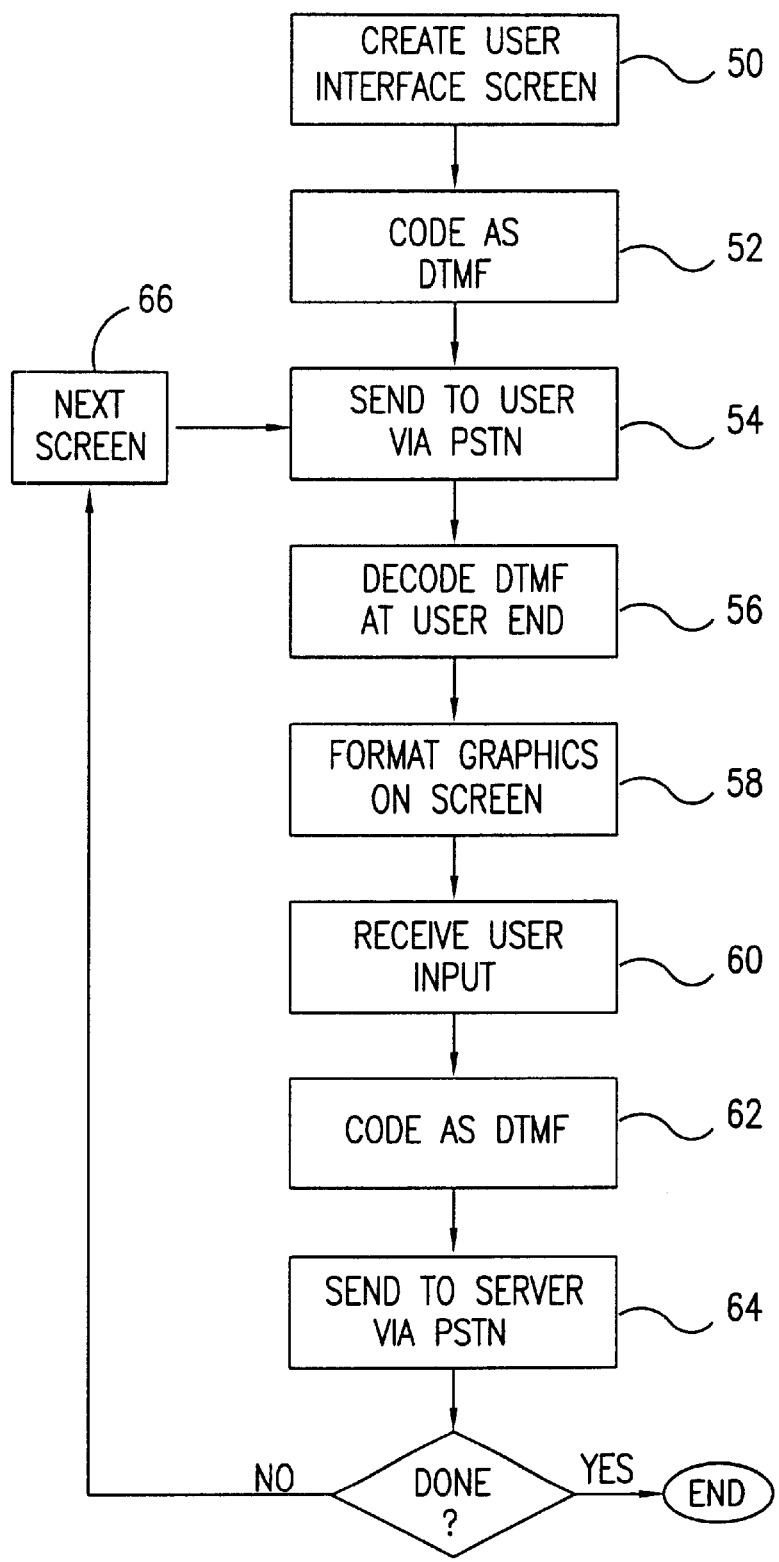

ADAPTABLE SUBSCRIBER UNIT FOR INTERACTIVE TELEPHONE APPLICATIONS

FIELD OF THE INVENTION

The present invention relates generally to telephone communications, and specifically to automated interactive telephone systems.

BACKGROUND OF THE INVENTION

Interactive telephone systems, generally known as Interactive Voice Response (IVR) systems, have achieved very broad use in businesses and particularly in telephone-based services. A user phoning into such a system receives a computer-generated voice prompt and responds by pressing an appropriate key or keys of the telephone. Pressing the telephone keys generates standard DTMF (Dual-Tone Multi-Frequency) signals, which are received by the IVR. There are sixteen different DTMF signals defined by the International Telecommunications Union (ITU), twelve of which (corresponding to digits 0 through 9, * and #) are used with standard telephone keypads. The user input can lead to additional voice prompts and responses, continuing until the IVR has received all of the information it is programmed to solicit. The IVR may also receive and record voice inputs from the user.

Anyone who has interacted with IVRs of this sort is aware of their shortcomings and the frustrations that they cause. Generally, at each stage of the interaction, the user must listen to an entire menu of choices. The process is time-consuming and requires that the user remember which key will invoke the desired choice. Because of the limitations of this interaction model, the user must navigate linearly from one stage to the next in a rigid, pre-programmed branching structure. There is generally no choice but to return to the beginning if it turns out that the user has chosen the wrong branch at some stage. Verification of the user's input is provided by time-consuming voice playback. The user can generally correct errors, when they occur, only by repeating the entire erroneous entry.

Telephones with graphic user interfaces are known in the art. For example, U.S. Pat. No. 5,838,775 describes a telephone with a touch screen (a "screen telephone"), having selectable graphical objects displayed on the screen to correspond to the push buttons of traditional telephones. The screen can also be used to display enhanced telephone service features, such as caller identification and automatic redial. A user of the screen telephone is able to download over the telephone network different multimedia interactive interfaces to run on the screen, including textual, graphic, animation, audio and video media.

SUMMARY OF THE INVENTION

It is an object of the present invention to provide improved systems and methods for automated interactive telephone applications.

It is an object of some aspects of the present invention to provide interactive telephone systems and devices offering enhanced flexibility, speed and ease of use.

It is a further object of some aspects of the present invention to provide interactive telephone systems and devices that are accessible to the hearing-impaired.

In preferred embodiments of the present invention, an interactive telephone subscriber unit comprises a display on which a flexible graphic user interface is shown. The interface is configured and varied in real time responsive to DTMF signals conveyed over a telephone line from an interactive telephone system, or IVR, in accordance with a predetermined communication protocol. The protocol enables an operator of the IVR to generate screens on the user device that include both text and graphical elements, and which prompt the user to make selections and input data in response. Optionally, the IVR is programmed to generate voice prompts, as well, in conjunction with the screens that are displayed. Preferably, the display comprises a touch screen, by means of which the user enters selections and alphanumeric responses. Alternatively or additionally, user responses may be entered using a standard telephone keypad. In either case, the user inputs are coded and returned to the IVR as DTMF signals.

In some preferred embodiments of the present invention, the subscriber unit comprises a full-function telephone, with an appropriate display. The telephone includes a microprocessor programmed to generate the graphic user interface based on the DTMF communication protocol. In other preferred embodiments, the subscriber device comprises a stand-alone box with a suitable processor and display, which is connected to the telephone line together with a conventional voice telephone.

The present invention thus enables businesses and other service providers to construct combined visual and audio applications for automated transaction processing and information retrieval over the telephone. Depending on how the present invention is implemented, little or no modification is generally required to the service provider's existing telephony infrastructure or to IVRs known in the art (although it is necessary that the subscriber have an appropriate subscriber unit). Rather, a suitable authoring tool is used to design the screens and then to generate the DTMF codes corresponding to the screens, in accordance with the protocol. These DTMF codes are then recorded for playback by the IVR instead of or in addition to the recorded voice prompts that are currently the sole means available for user interaction. For users who are equipped with suitable subscriber units, interaction with IVRs that are programmed in this manner is substantially faster and more efficient than with IVRs known in the art, and enables service providers to provide greatly enhanced functionality. Such subscriber units and IVRs can also be used by the hearing-impaired.

There is therefore provided, in accordance with a preferred embodiment of the present invention, a method for telephone communications, including:

providing a protocol that defines a relation between predetermined graphic elements and respective sequences of dual-tone multi-frequency (DTMF) signals;

designing a screen to be displayed including one or more of the graphic elements;

generating an encoded representation of the screen using DTMF signals in accordance with the protocol; and transmitting the encoded representation over a telephone line to a telephone subscriber unit, whereby the one or more graphic elements are displayed by the subscriber unit responsive to the encoded representation of the screen.

Preferably, providing the protocol includes providing an ordering mechanism, which enables different arrangements of the graphic elements to be defined on the screen, wherein designing the screen includes defining an order of the graphic elements using the ordering mechanism, and wherein the telephone subscriber unit renders the graphic elements to a display associated with the unit responsive to the defined order and in an arrangement dependent upon a characteristic of the display.

Preferably, the predetermined graphic elements include one or more on-screen push-buttons. Additionally or alternatively, the predetermined graphic elements include one or more alphanumeric elements, wherein designing the screen includes determining a font in which one of the one or more alphanumeric elements is to be displayed and generating an indication of the font in accordance with the protocol. Further additionally or alternatively, providing the protocol includes providing a mechanism for playing a voice output at the subscriber unit in conjunction with displaying the one or more graphic elements. Moreover, additionally or alternatively, providing the protocol includes providing a mechanism for generating a representation of a non-predetermined graphic element, and wherein designing the screen includes inputting a bitmap in accordance with the mechanism.

Preferably, transmitting the encoded representation includes loading the encoded representation into a interactive voice response system (IVR) and programming the IVR to transmit the representation in response to a call from the subscriber unit.

Preferably, designing the screen includes designing an interactive screen so as to generate a prompt for a reply at the subscriber unit, and the method includes receiving a user input at the subscriber device responsive to the prompt. Most preferably, receiving the user input includes receiving an encoded representation of the user input using DTMF signals in accordance with the protocol. Additionally or alternatively, receiving the user input includes receiving a voice input. Further preferably, the method includes transmitting an encoded representation of a further display screen responsive to the user input.

There is also provided, in accordance with a preferred embodiment of the present invention, a method for telephone communications, including:

receiving dual-tone multi-frequency (DTMF) signals corresponding to an encoded representation of a screen to be displayed including one or more graphic elements; and rendering the one or more graphic elements to a display responsive to the received DTMF signals.

Preferably, receiving the DTMF signals includes receiving signals that define an order of the graphic elements in accordance with a predetermined ordering mechanism, which enables different arrangements of the graphic elements to be defined on the display screen, and rendering the one or more graphic elements includes rendering the elements responsive to the defined order and in an arrangement dependent upon a characteristic of the display. Most preferably, rendering the elements in the arrangement dependent upon the characteristic of the display includes arranging the elements in a manner consonant with a resolution of the display. In a preferred embodiment, arranging the elements includes adding a scroll bar when a resolution needed to view all of the one or more graphic elements exceeds the resolution of the display.

There is additionally provided, in accordance with a preferred embodiment of the present invention, a telephone subscriber unit, including:

a display;

a telephone line interface, adapted to receive dual-tone multi-frequency (DTMF) signals over a telephone line; and a processor, which is coupled to receive from the telephone line interface a sequence of the DTMF signals representing a screen to be displayed including one or more graphic elements, which are encoded using the DTMF signals, and to decode the DTMF signals and, responsive thereto, to render to the display the one or more graphic elements.

Preferably, the subscriber unit includes a memory, which stores data associated with a predefined protocol for use by the processor in decoding the DTMF signals and rendering the one or more graphic elements. Further preferably, the one or more graphic elements include alphanumeric characters, and the memory stores a plurality of fonts, which are recalled by the processor so as to render the characters as specified by the protocol. Alternatively or additionally, the one or more graphic elements include graphic icons, which are recalled by the processor for display as specified by the protocol.

Preferably, the screen rendered by the processor includes an interactive screen that includes a prompt for a reply by a user of the device, and the unit includes a user input device, which is operated by the user to provide an input responsive to the prompt. Further preferably, the processor generates an encoded representation of the user input using DTMF signals and transmits the DTMF signals through the telephone line interface. Preferably, the user input device includes a touch-sensitive screen. Alternatively or additionally, the user input device includes a keypad. Further alternatively or additionally the user input device includes a microphone, through which the user inputs a voice response.

There is further provided, in accordance with a preferred embodiment of the present invention, a computer software product, including a computer-readable medium in which program instructions are stored, which instructions, when read by a computer, cause the computer to display a screen including one or more graphic elements selected by a user from among a predetermined set of graphic elements, and to generate an encoded representation of the screen using dual-tone multi-frequency (DTMF) signals, to be transmitted over a telephone line to a telephone subscriber unit, in accordance with a protocol that defines a relation between the graphic elements in the set and respective sequences of DTMF signals, whereby the one or more graphic elements are displayed by the subscriber unit responsive to the encoded representation of the screen.

There is moreover provided, in accordance with a preferred embodiment of the present invention, an interactive telephone system, which stores an encoded representation of a screen to be displayed by a telephone subscriber unit, the screen including one or more graphic elements selected from among a predetermined set of graphic element, and the representation including DTMF signals that encode the elements in accordance with a protocol that defines a relation between the graphic elements in the set and respective sequences of dual-tone multi-frequency (DTMF) signals, and which transmits the encoded representation over a telephone line to a telephone subscriber unit, whereby the one or more graphic elements are displayed by the subscriber unit responsive to the encoded representation of the screen.

The present invention will be more fully understood from the following detailed description of the preferred embodiments thereof, taken together with the drawings in which:

BRIEF DESCRIPTION OF THE DRAWINGS

FIG. 2 is a schematic block diagram of an interactive telephone subscriber device, in accordance with a preferred embodiment of the present invention; and FIG. 3 is a flow chart that schematically illustrates a method for user interaction with an interactive telephone system, in accordance with a preferred embodiment of the present invention.

DETAILED DESCRIPTION OF PREFERRED EMBODIMENTS

Figure 1:
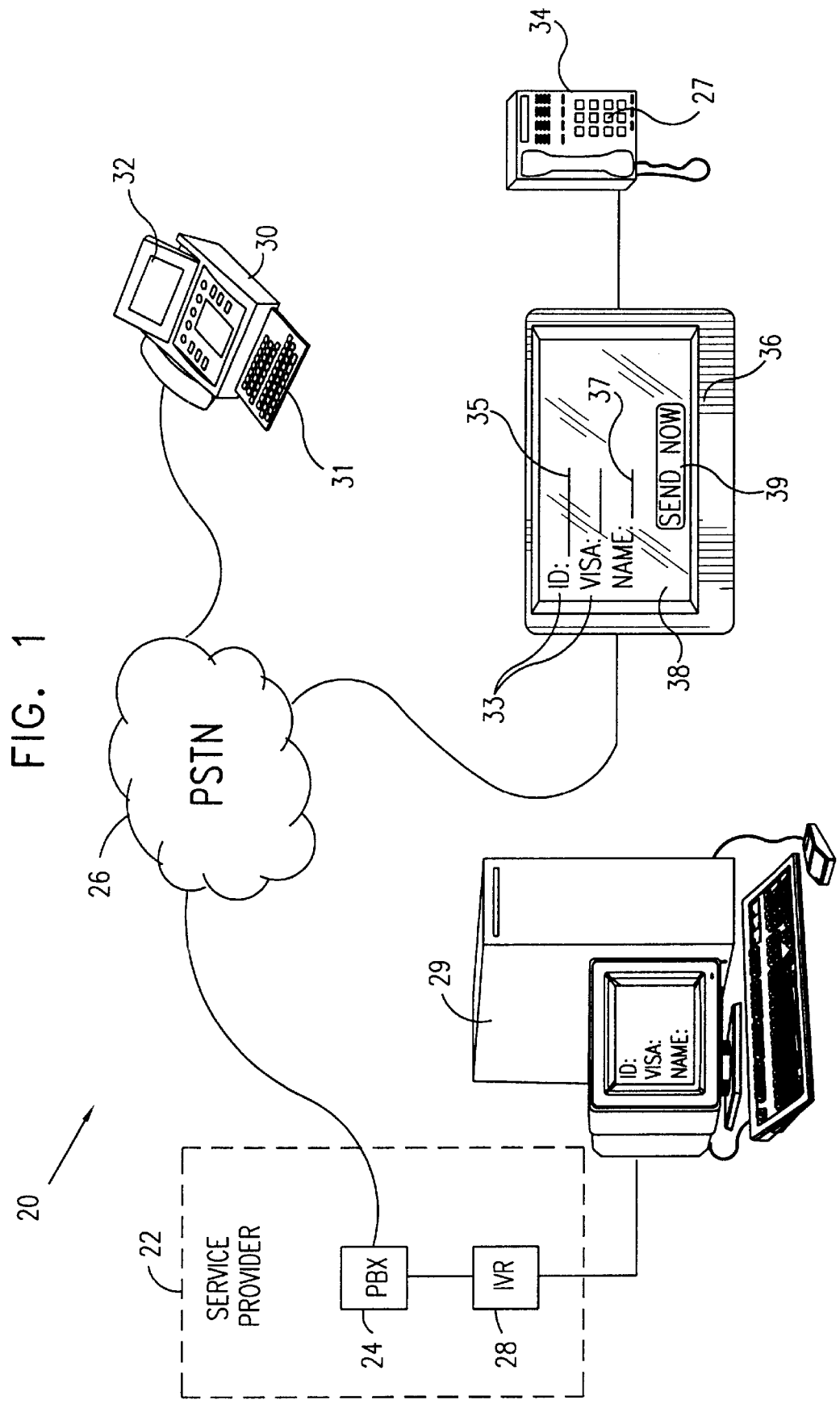
FIG. 1 is a schematic illustration of a system for interactive telephone applications, in accordance with a preferred embodiment of the present invention.

FIG. 1 is a schematic illustration of a system 20 for interactive telephone applications, in accordance with a preferred embodiment of the present invention. A telephone service provider facility 22 comprises an IVR 28, which is typically coupled by a switchboard, such as a PBX 24, to a telephone network, generally a public switched telephone network (PSTN) 26. For example, a suitable IVR for this purpose is the IBM Corepoint Voice Response system, which is described at http://www.corepoint.com. When a user dials in to the service provider through the telephone network, the call is connected by the PBX to the IVR for response. In response to the call, the IVR is programmed to generate sequences of DTMF signals in accordance with a standard IVR protocol. A suitable protocol of this type is described in detail hereinbelow. These DTMF signals are received by the user's subscriber unit, such as a telephone, and cause the unit to generate interactive, graphic user interface screens, as described in detail hereinbelow.

The response of IVR 28 to the user call depends on the type of subscriber device from which the user is calling, which is identified by the IVR in an initial handshaking procedure. One such subscriber device is a "smart" telephone 30 with a display 32, typically a LCD, and a microprocessor which is programmed to respond to the IVR protocol. Preferably, display 32 comprises a touch screen, as is known in the art. Alternatively, the user may interact with and make selections from the display using suitable pushbuttons provided on telephone for this purposes. Although smart telephones having such user interaction capabilities are known in the art, telephone 30 is modified relative to such telephones, typically by addition of suitable software to an embedded microprocessor in the telephone. This software enables the microprocessor to decode DTMF signals and generate graphic screens on display 32 in accordance with the standard protocol.

The subscriber may also use a decoding box 36, with a graphic display 38, in conjunction with an ordinary "dumb" telephone 34. In this case, box 36 intercepts DTMF signals sent by IVR 28 and generates the appropriate graphic screens on display 38 in response to the signals. Ordinary audio signals and DTMF signals that do not accord with the protocol are simply passed on to telephone 34. The function of decoding box 36 may also be carried out by a personal computer (not shown in the figure) that has a suitable telephone connection or audio peripherals and has software for placing outgoing telephone calls for the user, as is known in the art. In this case, a suitable software module for DTMF decoding is simply added to the telephony software running on the computer. The software module may be downloaded to the personal computer over a network, or else it may be supplied on tangible media, such as CD-ROM.

On the other hand, if the user is calling from an ordinary, audio-only telephone, or if there is some failure in protocol handshaking, then IVR 28 responds to the user with a sequence of voice prompts, as is known in the art.

As illustrated on display 38, the screens generated by DTMF signals from IVR 28 may include a variety of textual elements 33 and graphic elements 39, as well as other media. These screens are preferably generated using a suitable authoring tool, which typically runs on a standard computer workstation 29, such as a personal computer. The authoring tool enables an operator of facility 22 to lay out the desired elements on the screen, and then automatically encodes each screen as a corresponding sequence of DTMF signals, in accordance with the IVR protocol. These sequences are recorded in a memory of IVR 28 for playback in response to user calls. Authoring software for laying out the screens and encoding them as DTMF signals may be downloaded to workstation 29 over a network, or alternatively, it may be supplied on tangible media, such as CD-ROM, for installation on the workstation.

Display 38 shows a number of the different types of elements that may be included in screens generated by workstation 29 and transmitted to the user in DTMF-coded form by IVR 28. Such elements are displayed in like fashion by display 32 on telephone 30. These elements include:

Push buttons, such as a "send now" button 39 shown on the display. Preferably, the protocol defines a variety of standard button shapes, such as square, circle, oblong, etc., that may be invoked for this purpose. Most preferably, display 38 comprises a touch screen, by means of which the user selects these push buttons and interacts with other graphic elements on the display. Alternatively, off-screen buttons may be provided for this purpose, as noted above with reference to telephone 30.

Fixed text fields, used, for example, to generate textual elements 33, which prompt the user to input appropriate data, or to convey information to the user.

Numeric input fields, represented by a line 35 on display 38. Preferably, the user inputs data to these fields using a numerical keypad 27 on the telephone or, alternatively, using selectable number keys on a touch screen or a keypad or keyboard (not shown) associated with box 36.

Alphanumeric input fields, represented by a line 37 on display 38. The user can input data for these fields using the telephone keypad, as well. Typically, multiple keystrokes are used to generate the different letters represented by each of the telephone keys. Alternatively, an alphanumeric keyboard 31, already provided with some "smart" telephones, may be used for this purpose. Further alternatively or additionally, display 38 may include a pressure-sensitive region on which the user writes characters with a suitable stylus. The strokes of the stylus are recognized and identified as letters or numbers. This feature is used in personal digital assistants known in the art, such as "Palm" devices produced by 3Com, and could be implemented in box 36 in a straightforward manner. Still further alternatively, a touch-sensitive keyboard or keypad may be presented on display 38.

Custom graphic icons, typically 8×8 or 12×12 pixels in size. These icons may be predefined and stored in a memory of box 36 or telephone 30, as described hereinbelow. Alternatively or additionally, the protocol enables workstation 29 to define, and IVR 28 to transmit, bitmap fields of one or more different sizes, so that non-predefined icons can be displayed.

Preferably, at least some of the screens defined by workstation 29 also include voice output and voice input fields. Thus, audible instructions to the user of telephone 30 or 34 may be played over the telephone in conjunction with the screens, and the user may be prompted to provide voice responses instead of or in addition to numeric and/or alphanumeric inputs.

The elements described above are listed by way of example, rather than limitation. Other media, such as animations, may also be incorporated in the protocol to be played on display 32 or 38. Furthermore, additional elements and even program modules may be downloaded to telephone 30 or box 36 in the form of DTMF codes, in a manner analogous to downloading of applets and software plug-ins over the Internet.

FIG. 2 is a block diagram that schematically illustrates functional elements of box 36, in accordance with a preferred embodiment of the present invention. Similar elements are implemented in telephone 30. A telephone interface 40 receives signals conveyed over PSTN 26, including the DTMF codes generated by IVR 28. After a connection has been made between telephone 34 and service facility 22 (typically, although not necessarily, after the telephone user has dialed in to the facility), interface 40 listens to the signals received from the IVR and diverts any DTMF signals to a coding and decoding block 42. This block converts the DTMF signals into a sequence of the corresponding 4-bit digital values and passes these values to a central processing unit (CPU) 44. Although block 42 and CPU 44 are shown in FIG. 2 as separate units, these elements, as well as a memory 46 associated with the CPU, are preferably implemented in a single integrated circuit that includes a microprocessor, memory and suitable interfaces.

CPU 44 interprets the digital values in accordance with the IVR protocol, based on instructions and data stored in memory 46. Preferably, the stored data include standard fonts, buttons, fields, icons and data vocabulary defined by the protocol and factory-programmed in memory 46. The data vocabulary includes frequently-used words and expressions, which are pre-stored in the memory in the form of short sequences of 4-bit values, to reduce the time needed to download a screen. Preferably, the protocol also provides message formats for conveying additional elements, such as fonts, graphics, data vocabulary and program modules to box 36, over PSTN 26. CPU 44 stores these elements in memory 46 for use in generating screens on display 38. The memory may also be programmed with user data, such as the name, address, credit card number and other identifying details of a subscriber, using box 36. The subscriber can then select these data in response to appropriate prompts from IVR 28, without having to input all of the information from scratch each time he or she communicates with such an IVR.

FIG. 3 is a flow chart that schematically illustrates a method for communication between service facility 22 and a user of box 36, in accordance with a preferred embodiment of the present invention. Although this preferred embodiment is described with reference to box 36, it may likewise be implemented using telephone 30 or any other suitably-configured subscriber unit.

At an interface screen creation step 50, workstation 29 is used to generate a family of screens to be shown on display 38. These screens may include data entry screens, as shown in FIG. 1, or user information and selection screens, such as a listing of services available and/or telephone extensions at facility 22, or substantially any other type of screen that is supported by the protocol. Branching from one screen to the next within the family, based on user responses, is preferably also specified at this stage. At an output coding step 52, the workstation generates an encoded representation of each screen according to the protocol, comprising sequences of DTMF signals representing the elements on the screen in their proper order. The contents of a communication buffer are defined in accordance with the protocol with respect to each screen that is to be transmitted. Table I below shows the elements that are typically included in such a buffer, in accordance with a preferred embodiment of the present invention:

TABLE I

| Field | Length (bits) | Contents |
| --- | --- | --- |
| NS/US | 4 or 8 | NS (new screen) is sent at the beginning of a transmission to clear the screen. US (update screen) is sent to update the current screen. |
| NE | 8 | Number of elements in the screen. |
| NC | 4 or 8 | Signals beginning of a new column on screen. |
| H | 16+ | Identifies entity type and payload length for each element on the screen. Typical entity types and the corresponding headers are listed below in Table II. |
| Payload | Defined by header | Generally text, but may also comprise a bitmap, a voice output (to be generated at an appropriate time by IVR 28) or a voice input (which the user is prompted to provide through telephone 34). |
| ECC | 8 or 16 | An error-correcting code, as is known in the art, such as a CRC. |
| EOB | 4 or 8 | End of buffer. |

The protocol elements listed above are given here by way of example. Those skilled in the art will appreciate that the field definitions may be refined, altered and expanded to meet the functional needs of different applications.

Table II lists the data to be included in the buffer for different types of elements that may be included in screens to be transmitted by IVR 28, in accordance with a preferred embodiment of the present invention:

TABLE II

| Type | Header | Payload |
| --- | --- | --- |
| Button (B) | [ID], Type (text/graphic), TextLength | Text |
| Fixed text (FT) | [ID], Font, Size, TextLength | Text |
| Alphanumeric input (AI) | [ID], Type (numeric/alphanumeric), TextLength | Text (to be input by user) |
| Voice output (VO) | [ID], Type, Length | Audio |
| Voice input (VI) | [ID], Type, Length | Audio (to be input by user) |
| Icon (I) | [ID], Type (8 × 8, 12 × 12 or other predefined size) | Bitmap or reference to stored picture |

Alternatively, if the subscriber unit, such as box 36 or telephone 30, has appropriate speech synthesis and speech recognition capabilities, the voice output and input fields may have text payloads, which are respectively converted to or from audio signals by the subscriber unit.

As shown in the table above, each of the headers includes an optional identifier (ID) field, indicating the order in which the corresponding elements are to appear on the screen. Alternatively, if the ID field is not used, the elements are simply enumerated in sequence.

Returning now to FIG. 3, at step 52, the DTMF code sequences corresponding to each of the relevant screens are downloaded from workstation 29 to IVR 28, as mentioned hereinabove. The IVR is programmed to play the DTMF sequences, along with any required voice output fields, in the appropriate order. At a DTMF send step 54, a user dials in to facility 22, using telephone 34, for example, and the call is routed to the IVR. Preferably, at this stage, the IVR initiates a handshaking routine in order to determine whether the user's subscriber equipment is configured to receive and display data screens in accordance with the protocol. The handshake may be in the form of a voice query, such as "If your telephone is equipped to display IVR data, press '5'." Alternatively, the handshake may take place automatically between IVR 28 and CPU 44 at the user end. It is also noted that although this preferred embodiment is described with reference to a user dialing in to facility 22, a similar routine may be used on outgoing calls placed automatically by the IVR. Once the IVR has verified that the user is equipped to display the data screens, the first screen is downloaded to box 36 over PSTN 26. Otherwise, the IVR reverts to a voice-only interaction mode.

At a decoding step 56, decoding block 42 of box 36 decodes the DTMF signals received from interface 40 and passes them to CPU 44. Preferably, when an incoming DTMF code sequence is detected by box 36, the output from interface 40 to telephone 34 is blocked, so that the user does not hear the DTMF tones. The CPU refers to memory 46 in order to determine which elements are to be displayed on screen and to render the elements in accordance with the protocol. To the extent that any of the data conveyed by the DTMF code sequence appears to be erroneous, either because of an incorrect ECC computation or an unrecognized header, for example, CPU 44 preferably sends a resend request back to IVR 28.

At a formatting step 58, the CPU arranges the elements and displays them on display 38. Preferably, the arrangement of the elements on display 38 is not fixed in advance by the protocol, since different subscriber units may have displays of differing sizes and resolution. CPU 44 is programmed to arrange the elements on display 38 in a manner appropriate to the characteristics of the display, albeit in an order that corresponds to the IDs given in the header fields or sequential ordering of the elements, as described hereinabove. Preferably, if the pixel area of the visual data in a given screen exceeds the available area on display 38, the CPU automatically adds vertical and/or horizontal scroll bars to the screen.

At a user input step 60, the user of box 36 inputs data in response to the prompts appearing on the screen. To input the data, the user selects each of the input fields in turn, preferably using the touch screen of display 38. The user then inputs the data using either the touch screen or other controls on box 36 or telephone 34, as described hereinabove. The user makes voice inputs simply by speaking into telephone 34. The selections and alphanumeric data input by the user are coded as DTMF signals by CPU 44 and DTMF block 42 at an input coding step 62. The coded data are organized for uploading to IVR 28 in a buffer format similar to that used for the screens downloaded to box 36. In the case of uploaded data, however, it is sufficient that each field have an identifier, corresponding to the ID number of the element on the screen, followed by the appropriate user input data.

At a send data step 64, the user input data are returned via PSTN 26 to IVR 28. The IVR is programmed to respond to the data by calling up the next appropriate data screen, at a next screen step 66, and transmitting the screen to be shown on display 38. Alternatively, as appropriate, the IVR routes the call to a human agent at facility 22 or terminates the call.

Although preferred embodiments are described hereinabove with reference to DTMF codes, it will be appreciated that the principles of the present invention may similarly be applied using other methods for coding data in the form of audio signals. DTMF coding has the advantage that it is supported by existing IVRs and other common telephone devices, so that the present invention may be implemented without substantial investments in new infrastructure and equipment and without the addition of costly modem circuitry at either the service facility or the subscriber end.

It will be appreciated that the preferred embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

What is claimed is:

1. A method for telephone communications, comprising:
   providing a protocol that defines a relation between predetermined graphic elements, including at least first and second graphic elements, and respective sequences of dual-tone multi-frequency (DTMF) signals including at least first and second sequences of the DTMF signals, corresponding respectively to the first and second graphic elements;
   designing a screen to be displayed including at least the first and second graphic elements;
   generating an encoded representation of the screen using the first and second sequences of the DTMF signals in accordance with the protocol; and
   transmitting the encoded representation over a telephone line to a telephone subscriber unit, whereby the first and second graphic elements are displayed together by the subscriber unit responsive to the encoded representation of the screen.

2. A method according to claim 1, wherein providing the protocol comprises providing an ordering mechanism, which enables different arrangements of the graphic elements to be defined on the screen.

3. A method according to claim 2, wherein designing the screen comprises defining an order of the graphic elements using the ordering mechanism, and wherein the telephone subscriber unit renders the graphic elements to a display associated with the unit responsive to the defined order and in an arrangement dependent upon a characteristic of the display.

4. A method according to claim 1, wherein the predetermined graphic elements comprise one or more on-screen push-buttons.

5. A method according to claim 1, wherein the predetermined graphic elements comprise one or more alphanumeric elements.

6. A method according to claim 5, wherein designing the screen comprises determining a font in which one of the one or more alphanumeric elements is to be displayed and generating an indication of the font in accordance with the protocol.

7. A method according to claim 1, wherein providing the protocol comprises providing a mechanism for playing a voice output at the subscriber unit in conjunction with displaying the one or more graphic elements.

8. A method according to claim 1, wherein providing the protocol comprises providing a mechanism for generating a representation of a non-predetermined graphic element, and wherein designing the screen comprises inputting a bitmap in accordance with the mechanism.

9. A method according to claim 1, wherein transmitting the encoded representation comprises loading the encoded representation into a interactive voice response system (IVR) and programming the IVR to transmit the representation in response to a call from the subscriber unit.

10. A method according to claim 1, wherein designing the screen comprises designing an interactive screen so as to generate a prompt for a reply at the subscriber unit, and comprising receiving a user input at the subscriber device responsive to the prompt.

11. A method according to claim 10, wherein receiving the user input comprises receiving an encoded representation of the user input using DTMF signals in accordance with the protocol.

12. A method according to claim 10, wherein receiving the user input comprises receiving a voice input.

13. A method according to claim 10, and comprising transmitting an encoded representation of a further display screen responsive to the user input.

14. A method for telephone communications, comprising:
 receiving dual-tone multi-frequency (DTMF) signals corresponding to an encoded representation of a screen to be displayed including at least first and second graphic elements, the DTMF signals comprising at least first and second sequences of the DTMF signals, which correspond respectively to the first and second graphic elements; and
 rendering the screen including at least the first and second graphic elements to a display responsive to the received DTMF signals.

15. A method according to claim 14, wherein receiving the DTMF signals comprises receiving signals that define an order of the graphic elements in accordance with a predetermined ordering mechanism, which enables different arrangements of the graphic elements to be defined on the display screen, and wherein rendering the screen comprises rendering the graphic elements responsive to the defined order and in an arrangement dependent upon a characteristic of the display.

16. A method according to claim 15, wherein rendering the graphic elements in the arrangement dependent upon the characteristic of the display comprises arranging the graphic elements in a manner consonant with a resolution of the display.

17. A method according to claim 16, wherein arranging the elements comprises adding a scroll bar when a resolution needed to view all of the one or more graphic elements exceeds the resolution of the display.

18. A method according to claim 14, wherein receiving the DTMF signals comprises receiving an encoded representation of an interactive screen that includes a prompt for a reply, and comprising receiving and transmitting a user input responsive to the prompt.

19. A method according to claim 18, wherein transmitting the user input comprises transmitting an encoded representation of the user input using DTMF signals.

20. A method according to claim 18, wherein transmitting the user input comprises transmitting a voice response.

21. A telephone subscriber unit, comprising:
 a display;
 a telephone line interface, adapted to receive dual-tone multi-frequency (DTMF) signals over a telephone line; and
 a processor, which is coupled to receive from the telephone line interface a sequence of the DTMF signals representing a screen to be displayed including at least first and second graphic elements, which are encoded using the DTMF signals, the sequence of the DTMF signals comprising at least first and second subsequences of the DTMF signals, which correspond respectively to the first and second graphic elements, wherein the processor is arranged to decode the DTMF signals and, responsive thereto, to render to the display the screen including the first and second graphic elements.

22. A unit according to claim 21, and comprising a memory, which stores data associated with a predefined protocol for use by the processor in decoding the DTMF signals and rendering the graphic elements.

23. A unit according to claim 22, wherein the graphic elements comprise alphanumeric characters, and wherein the memory stores a plurality of fonts, which are recalled by the processor so as to render the characters as specified by the protocol.

24. A unit according to claim 22, wherein the graphic elements comprise graphic icons, which are recalled by the processor for display as specified by the protocol.

25. A unit according to claim 21, wherein an ordering mechanism is provided, enabling different arrangements of the graphic elements to be defined on the display screen, and wherein the processor renders the graphic elements to the display responsive to an order of the graphic elements defined by the ordering mechanism.

26. A unit according to claim 25, wherein the processor renders the graphic elements responsive to the order and in an arrangement dependent upon a characteristic of the display.

27. A unit according to claim 26, wherein the characteristic of the display responsive to which the processor arranges the graphic elements comprises a resolution of the display.

28. A unit according to claim 21, wherein the screen rendered by the processor comprises an interactive screen that includes a prompt for a reply by a user of the device, and wherein the unit comprises a user input device, which is operated by the user to provide an input responsive to the prompt.

29. A unit according to claim 28, wherein the processor generates an encoded representation of the user input using DTMF signals, and transmits the DTMF signals through the telephone line interface.

30. A unit according to claim 29, wherein the user input device comprises a touch-sensitive screen.

31. A unit according to claim 29, wherein the user input device comprises a keypad.

32. A unit according to claim 28, wherein the user input device comprises a microphone, through which the user inputs a voice response.

33. A computer software product, comprising a computer-readable medium in which program instructions are stored, which instructions, when read by a computer, cause the computer to display a screen including at least first and second graphic elements selected by a user from among a predetermined set of graphic elements, and to generate an encoded representation of the screen using dual-tone multi-frequency (DTMF) signals, to be transmitted over a telephone line to a telephone subscriber unit, in accordance with a protocol that defines a relation between the graphic elements in the set and respective sequences of DTMF signals, which comprise at least first and second sequences of the DTMF signals, corresponding respectively to the first and second graphic elements, whereby the screen including at least the first and second graphic elements is displayed by the subscriber unit responsive to the encoded representation.

34. An interactive telephone system, which stores an encoded representation of a screen to be displayed by a telephone subscriber unit, the screen comprising at least first and second graphic elements selected from among a predetermined set of graphic elements, and the representation comprising DTMF signals that encode the graphic elements in accordance with a protocol that defines a relation between the graphic elements in the set and respective sequences of dual-tone multi-frequency (DTMF) signals, which comprise at least first and second sequences of the DTMF signals, corresponding respectively to the first and second graphic elements, wherein the system transmits the encoded representation over a telephone line to a telephone subscriber unit, whereby the screen including at least the first and second graphic elements is displayed by the subscriber unit responsive to the encoded representation.

\* \* \* \* \*